(12) United States Patent
Beaupré-Laflamme et al.

(10) Patent No.: US 12,527,112 B2
(45) Date of Patent: Jan. 13, 2026

(54) MANAGING OPTICAL SHIELDING FOR INTEGRATED CIRCUITS

(71) Applicant: Ciena Corporation, Hanover, MD (US)

(72) Inventors: Raphael Beaupré-Laflamme, Quebec (CA); Antoine Bois, Quebec (CA); Michael Vitic, Chelsea (CA)

(73) Assignee: Ciena Corporation, Hanover, MD (US)

( * ) Notice: Subject to any disclaimer, the term of this patent is extended or adjusted under 35 U.S.C. 154(b) by 273 days.

(21) Appl. No.: 18/458,188

(22) Filed: Aug. 30, 2023

(65) Prior Publication Data

US 2025/0081667 A1    Mar. 6, 2025

(51) Int. Cl.
*G02B 6/12* (2006.01)
*G02B 6/122* (2006.01)
*H10F 77/40* (2025.01)

(52) U.S. Cl.
CPC ....... *H10F 77/413* (2025.01); *G02B 6/12004* (2013.01); *G02B 6/122* (2013.01)

(58) Field of Classification Search
CPC .... H10F 77/413; G02B 6/12004; G02B 6/122
USPC .......................................................... 385/14
See application file for complete search history.

(56) References Cited

U.S. PATENT DOCUMENTS

| | | |
|---|---|---|
| 11,217,713 B2 | 1/2022 | Pelletier et al. |
| 2002/0118941 A1 | 8/2002 | Notomi et al. |
| 2021/0167230 A1* | 6/2021 | Pelletier ............. G02B 6/12004 |

FOREIGN PATENT DOCUMENTS

EP    1434069 A2    6/2004

OTHER PUBLICATIONS

Joohee Kim and J. Kim, "Signal integrity modeling and measurement of TSV in 3D IC," 2013 18th Asia and South Pacific Design Automation Conference (ASP-DAC), Yokohama, Japan, 2013, pp. 13-16.

(Continued)

*Primary Examiner* — Jerry M Blevins
(74) *Attorney, Agent, or Firm* — Young Basile Hanlon & MacFarlane, P.C.

(57) ABSTRACT

Positioned between first and second planes of a volume are one or more optical elements. Light-impeding structures absorb light, reflect light, or both. Each light-impeding structure in a first set: intersects the first (and second) plane with a first (and second) cross-sectional shape, comprises a first (and second) maximum cross-sectional length equal to the length of the longest line between two maximally separated points of the first (and second) cross-sectional shape, and is separated from nearest neighboring light-impeding structures in the first set by a distance no larger than four times the length of the first maximum cross-sectional length or four times the length of the second maximum cross-sectional length. Light propagation through one or more points is impeded, such that any line that intersects at least one of the points, is entirely within the volume, and traverses through the first set, intersects at least one light-impeding structure.

20 Claims, 12 Drawing Sheets

(56) References Cited

OTHER PUBLICATIONS

J. Lim et al., "Shielding structures for through silicon via (TSV) to active circuit noise coupling in 3D IC," 2015 10th International Workshop on the Electromagnetic Compatibility of Integrated Circuits (EMC Compo), Edinburgh, UK, 2015, pp. 248-251, doi: 10.1109/EMCCompo.2015.7358366.

Arne Behrens and Stefan Sinzinger, "2.5D+ plasma etching for a continuously adjustable sidewall angle in SiO2," Optical Materials Express, vol. 13, Issue 6, pp. 1780-1796 (2023).

* cited by examiner

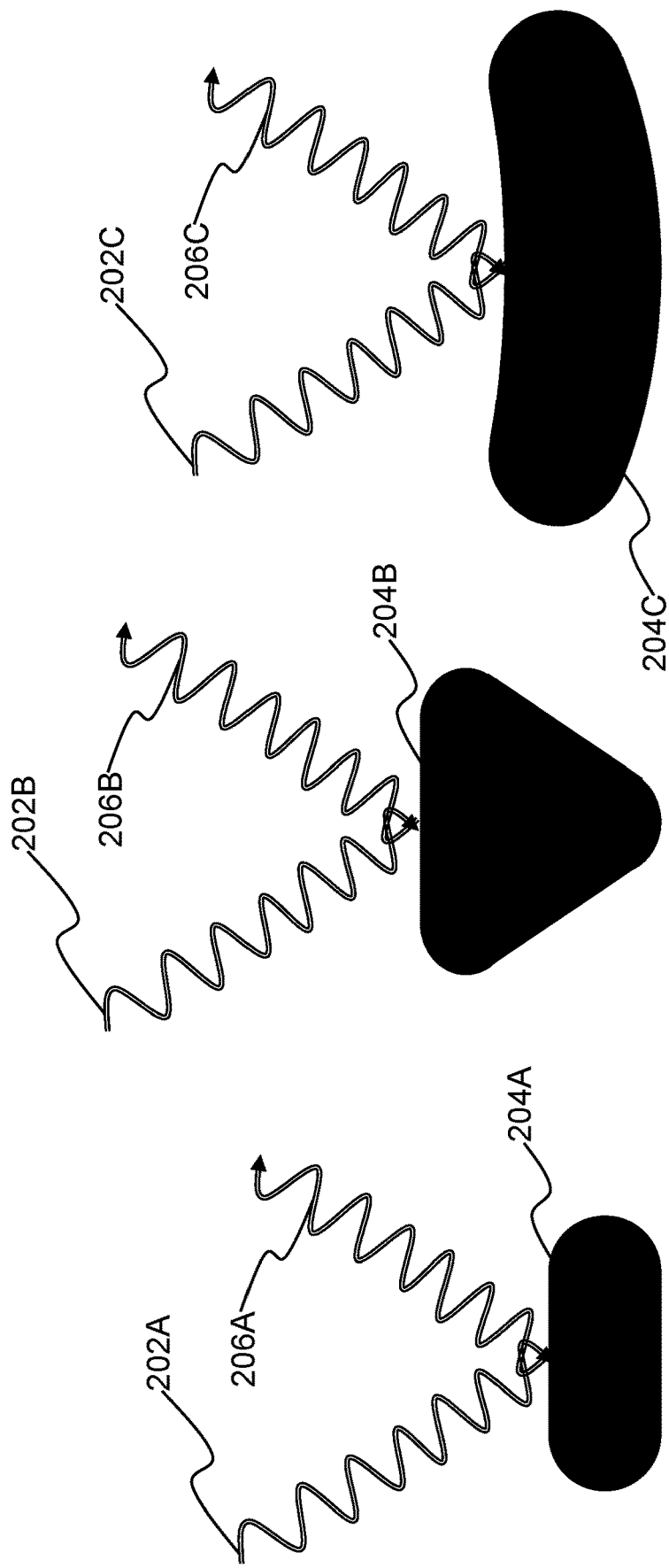

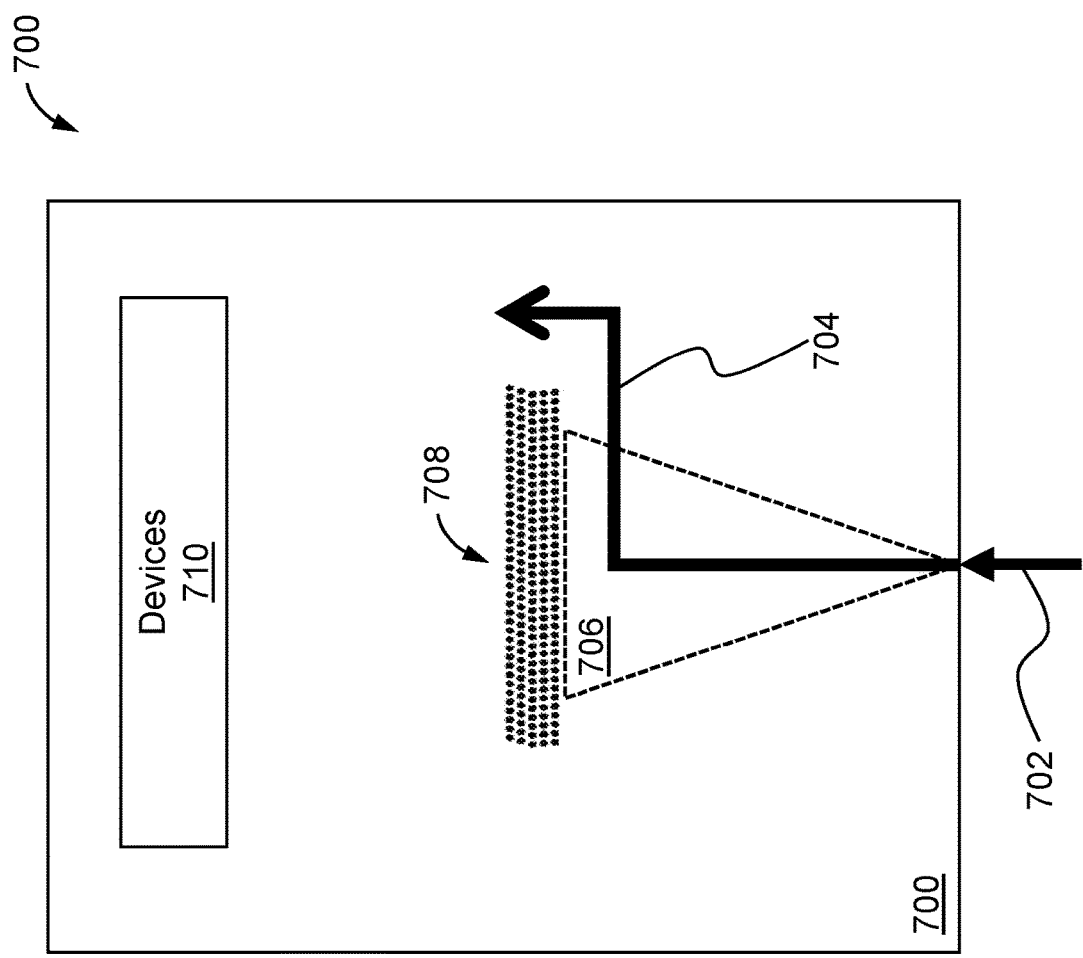

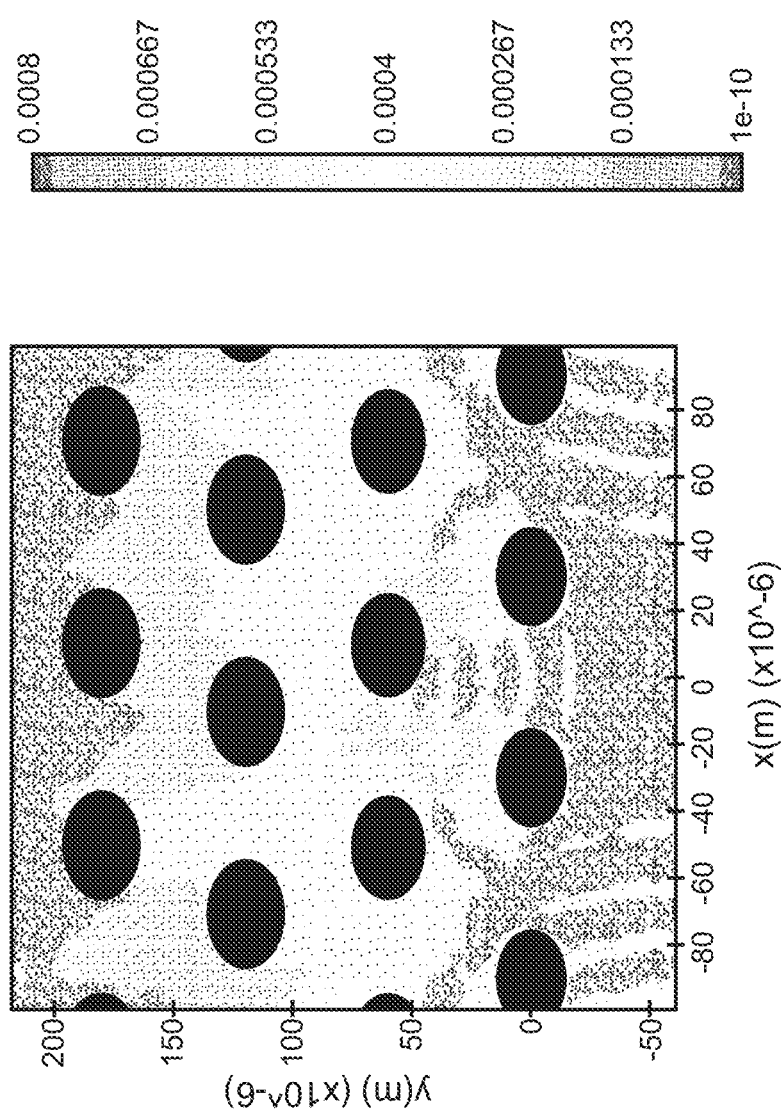
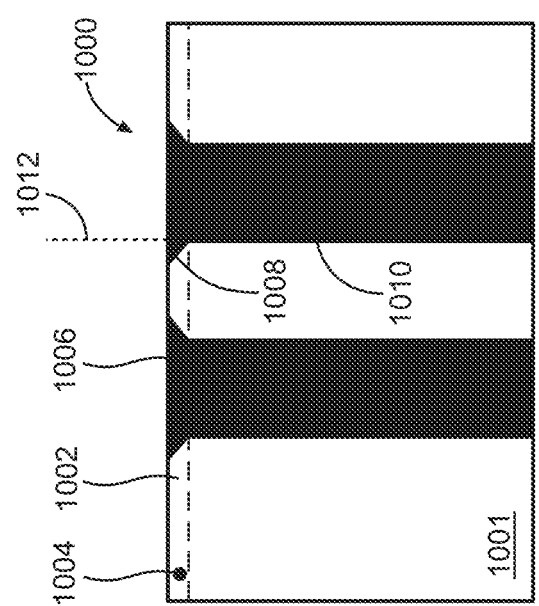
FIG. 10B
FIG. 10A

MANAGING OPTICAL SHIELDING FOR INTEGRATED CIRCUITS

TECHNICAL FIELD

This disclosure relates to managing optical shielding for integrated circuits.

BACKGROUND

Complementary metal-oxide-semiconductor (CMOS) and other fabrication techniques can be used to fabricate electronic integrated circuits (EICs), which operate using electrical signals (e.g., voltage signals and/or current signals). Similar fabrication techniques can be used to fabricate photonic integrated circuits (PICs) in silicon photonic (Si-Phot) or other photonic platforms. PICs often include optical waveguides for transporting optical waves to and from photonic devices, and may also include electrical signals (e.g., to control devices, such as electro-optic modulators, or to transmit measurement signals, such as from photodiodes).

Vias can be used in EICS and PICS to electrically connect two or more vertically offset conductive layers of the integrated circuit. In general, vias do not necessarily penetrate through the entire silicon wafer or die of an integrated circuit. However, through-silicon vias (TSVs) penetrate through the entire silicon wafer or die and can be used to route signals to the bottom-side bumps of a chip, for example. Vias may be used for 3D heterogeneous integration, such as stacked memory on top of a CPU. The use of vias can enable smaller integrated circuits with a higher density of components, a reduction in power usage, and increased operational bandwidth.

SUMMARY

In one aspect, in general, an article of manufacture comprises: a volume comprising one or more materials between a first plane and a second plane; positioned between the first plane and the second plane, at least a portion of one or more of an optical waveguide, an optical gain medium, a photodetector, or an electro-optic device; and a plurality of light-impeding structures configured to absorb light, reflect light, or both absorb and reflect light, the plurality of light-impeding structures comprising a first set of light-impeding structures arranged such that each light-impeding structure in the first set intersects the first plane with a first cross-sectional shape, intersects the second plane with a second cross-sectional shape, comprises a first maximum cross-sectional length equal to the length of the longest line between two maximally separated points of the first cross-sectional shape, comprises a second maximum cross-sectional length equal to the length of the longest line between two maximally separated points of the second cross-sectional shape, and is separated from one or more nearest neighboring light-impeding structures in the first set by a distance no larger than four times the length of the first maximum cross-sectional length or four times the length of the second maximum cross-sectional length; wherein light propagation through one or more points is impeded, such that any line that intersects at least one of the one or more points, is entirely within the volume, and traverses through the first set of light-impeding structures, intersects at least one light-impeding structure.

Aspects can include one or more of the following features.

The first cross-sectional shape and the second cross-sectional shape are geometrically similar.

The first cross-sectional shape and the second cross-sectional shape are geometrically congruent.

The light has a wavelength between about 100 nm and 1 mm.

Each light-impeding structure in the first set intersects a third plane located between the first plane and the second plane with a third cross-sectional shape, and comprises a third maximum cross-sectional length equal to the length of the longest line between two maximally separated points of the third cross-sectional shape wherein the third maximum cross-sectional length is not equal to at least one of the first maximum cross-sectional length, or the second maximum cross-sectional length.

The third maximum cross-sectional length is not equal to the first maximum cross-sectional length and is equal to the second maximum cross-sectional length.

The one or more materials between the first plane and the third plane comprise at least one of silicon dioxide or silicon nitride; and the one or more materials between the third plane and the second plane comprise silicon, indium phosphide (InP), lithium niobate, or doped silicon dioxide.

At least one of the one or more materials between the first plane and the third plane has a first index of refraction; and at least one of the one or more materials between the third plane and the second plane comprise has a second index of refraction greater than the first index of refraction.

The third maximum cross-sectional length is larger than each of the first maximum cross-sectional length and the second maximum cross-sectional length.

At least a portion of the metallic layer is vertically above or below at least a portion of the one or more of the optical waveguide, the optical gain medium, the photodetector, or the electro-optic device.

At least one of the optical waveguide, the optical gain medium, the photodetector, or the electro-optic device is configured to be used in an interferometric measurement.

At least one of the optical waveguide, the optical gain medium, the photodetector, or the electro-optic device is configured to be used to perform coherent transmitting or coherent receiving of light.

At least one of the optical waveguide, the optical gain medium, the photodetector, or the electro-optic device is configured to measure an intensity of light coupled from a first optical waveguide to a second optical waveguide.

A transmitted electromagnetic energy associated with light from the one or more points that traverses entirely through the light-impeding structures is smaller than an incident electromagnetic energy associated with light from the one or more points that is incident on the light-impeding structures.

The first set of light-impeding structures is positioned between the optical port and at least one of the optical waveguide, the optical gain medium, the photodetector, or the electro-optic device.

In another aspect, in general, a method comprises: forming a volume comprising one or more materials between a first plane and a second plane; forming, positioned between the first plane and the second plane, at least a portion of one or more of an optical waveguide, an optical gain medium, a photodetector, or an electro-optic device; and forming a plurality of light-impeding structures configured to absorb light, reflect light, or both absorb and reflect light, the plurality of light-impeding structures comprising a first set of light-impeding structures arranged such that each light-impeding structure in the first set intersects the first plane with a first cross-sectional shape, intersects the second plane with a second cross-sectional shape, comprises a first maximum cross-sectional length equal to the length of the longest line between two maximally separated points of the first cross-sectional shape, comprises a second maximum cross-sectional length equal to the length of the longest line between two maximally separated points of the second cross-sectional shape, and is separated from one or more nearest neighboring light-impeding structures in the first set by a distance no larger than four times the length of the first maximum cross-sectional length or four times the length of the second maximum cross-sectional length; wherein light propagation through one or more points is impeded, such that any line that intersects at least one of the one or more points, is entirely within the volume, and traverses through the first set of light-impeding structures, intersects at least one light-impeding structure.

Aspects can include one or more of the following features.

The light has a wavelength between about 100 nm and 1 mm.

Each light-impeding structure in the first set intersects a third plane located between the first plane and the second plane with a third cross-sectional shape, and comprises a third maximum cross-sectional length equal to the length of the longest line between two maximally separated points of the third cross-sectional shape wherein the third maximum cross-sectional length is not equal to at least one of the first maximum cross-sectional length, or the second maximum cross-sectional length.

The third maximum cross-sectional length is not equal to the first maximum cross-sectional length and is equal to the second maximum cross-sectional length.

At least one of the optical waveguide, the optical gain medium, the photodetector, or the electro-optic device is configured to measure an intensity of light coupled from a first optical waveguide to a second optical waveguide.

Aspects can have one or more of the following advantages.

The subject matter disclosed herein may significantly reduce or eliminate the amount of undesirable light impinging on light-sensitive components by implementing light-impeding structures in arrangements configured to shield the light-sensitive components from sources of stray light. One example of the use of such light-impeding structures is specially engineered and arranged arrays of optically shielding vias (OSVs), in conjunction with optical routing and placement optimized around their use. For example, OSVs may be configured to optically shield one or more photodiodes that receive a small intensity of signal light (e.g., from a tap waveguide that receives a small percentage of light from a primary waveguide), thus enhancing the sensitivity of the photodiodes and their ability to detect weaker optical signals. More specifically, OSVs can reduce the amount of stray light impinging on a photodiode such that the minimum power level at which the photodetector is able to detect a desired optical signal is improved (i.e., the signal to noise ratio of the photodiode is increased). The optical shielding of the OSVs may be further enhanced by the presence of additional elements such as lids, redistribution layers (RDLs), anti-reflective coatings, or absorbers, so as to eliminate optical coupling or re-entry of light from the top or bottom of the chip.

The subject matter disclosed herein can significantly reduce the size of integrated circuits, as well as the waveguide routing length and therefore the on-chip losses. By utilizing OSVs, light-sensitive components may only need enough space so as to fabricate an array of OSVs between themselves and the path of the undesirable light. For example, the OSVs may enable significant reductions to the dimensions of a chip comprising two or more coherent optical subassemblies (COSAs), such as a combined coherent receiver (Rx) and coherent transmitter (Tx) chip that may ordinarily be split into two chips so as to optically shield the Rx chip and the Tx chip from one another. The ability to combine chips that produce optical signals and sensitively detect optical signals may have clear benefits, such as reduced losses, increased signal-to-noise, reduced power consumption, simpler and higher optical coupling stability, simpler manufacturing, and cheaper production costs.

Other features and advantages will become apparent from the following description, and from the figures and claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 2A, 2B, and 2C are schematic diagrams of example cross-sectional shapes of optically shielding vias.

FIG. 7 is a schematic diagram of an example portion of an integrated circuit.

FIG. 10A is a schematic diagram of an example portion of an integrated circuit.

FIG. 10B is a prophetic plot of the electric field magnitude generated in a cross-section within a $SiO_2$ layer and perpendicular to the vertical oscillation direction of an electric dipole represented by a point source.

DETAILED DESCRIPTION

Figure 1A:
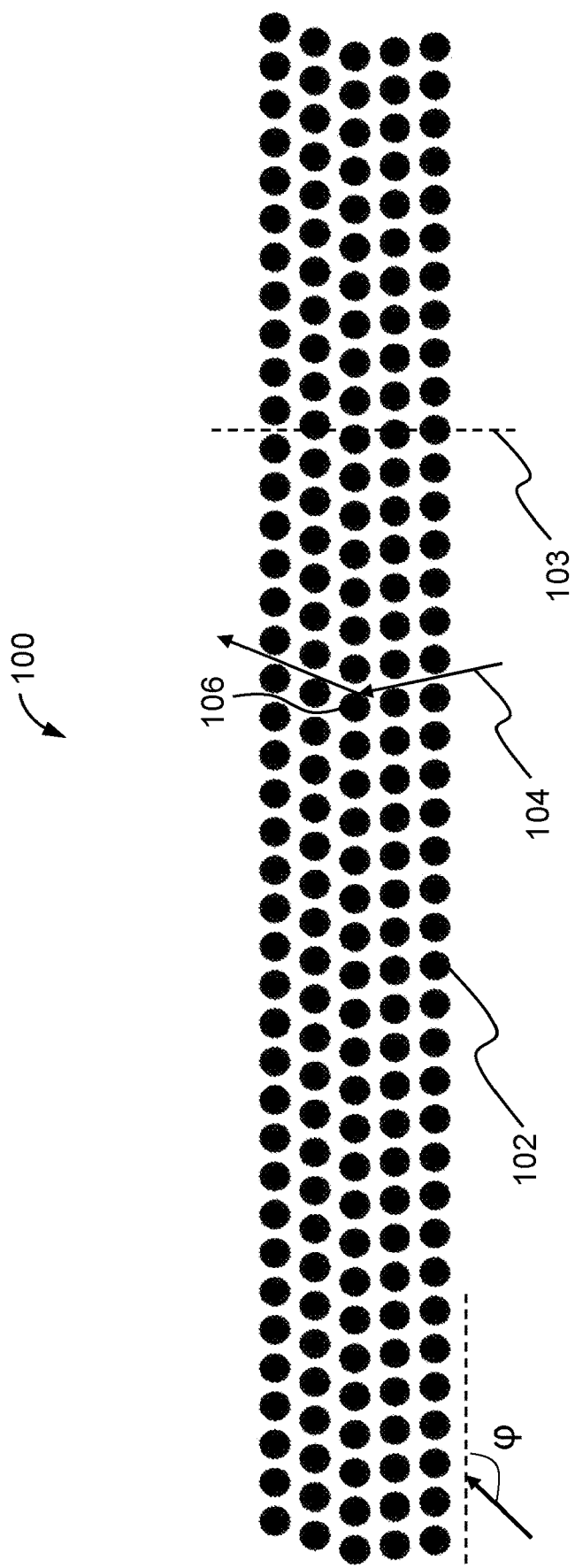
FIGS. 1A and 1B are schematic diagrams of an example staggered chevron pattern of optically shielding vias.

The subject matter disclosed herein can provide means for shielding regions in a semiconductor platform from electromagnetic (EM) radiation, particularly optical waves also referred to as light waves, or simply light, which have a peak wavelength that falls in a range of optical wavelengths (e.g., between about 100 nm to about 1 mm, or some subrange thereof). In a photonic integrated circuit (PIC), light may undesirably enter regions not in its intended design path due to on-chip scattering, optical fiber interfaces, or gain elements integrated within the semiconductor platform. This undesirable light, also referred to as optical contamination, may impede performance in devices which may negatively interact with the undesirable light, such as photodetectors and interferometric devices. For example, optical shielding may enhance the performance of photodiodes receiving light from in-line taps of optical receivers and optical transmitters for optical power reporting and dither/beat recovery loops, respectively.

A via is a conductive connection between two or more conductive layers in an integrated circuit. Vias can be made of copper or doped silicon, for example. By utilizing the techniques disclosed herein, one or more vias may be configured to absorb or scatter and redirect undesirable light away from devices that would benefit from being optically shielded (e.g., light sensitive devices such photodetectors or interferometric devices). A group of vias that provide optical shielding are herein referred to as optically shielding vias (OSVs). In some examples, the OSVs may be utilized to reduce circuit optical return loss (ORL) by redirecting impinging light. OSVs may also be beneficial in applications where both small and large signals are present, such as in a coherent receiver (Rx) comprising a very strong local oscillator (LO) and a comparatively weak signal port (SIG). As with normal vias, OSVs may also extend farther than between two conductive layers. A through-silicon via (TSV) is a hole etched through the entire vertical length of a chip (i.e., a wafer or a die) and filled with electrically conductive materials (e.g., copper or doped silicon) to provide an electrical interconnection between the top and the bottom of a chip. Herein, OSVs may include any via that provides a vertical conductive connection between two or more conductive layers in an integrated circuit, including TSVs, and that is arranged to provide optical isolation to a region of an integrated circuit.

In general, optical shielding may be engineered and designed according to several characteristics associated with the OSVs, such as their pattern (e.g., chevron, checkered, or irregular), separation, and pitch, width and area, in-plane shape (e.g., rectangular, circular, oblong), vertical slope, and material. Such characteristics may be markedly different from applications in which vias are used to shield much longer wavelengths of the electromagnetic spectrum, such as radio frequencies (RF) and microwave frequencies.

Some example optical shielding techniques that do not use vias involve conservative routing and placement of sensitive components far away from sources of undesirable light (also referred to as crosstalk), such as spot-size converters which can act as a large cone of light emission. However, such techniques may increase the size of the die (i.e., the IC), as well as the waveguide routing length and therefore on-chip losses. In addition to the limitations mentioned, such strategies may not provide sufficient optical shielding for the integration of chiplets which may be stacked in close proximity laterally or vertically.

Cancellation techniques, such as measuring and subtracting the background noise caused by stray light that would otherwise limit the capability of photodetectors to achieve a large dynamic range, may be used in conjunction with the subject matter disclosed herein. When used in conjunction with the techniques disclosed herein, such cancellation techniques may be enhanced in their cancellation capabilities.

Regarding the pattern, separation, and pitch of OSVs, since the wavelength of optical waves is vastly shorter than EM waves at RF and microwave frequencies, a traditional via fence designed for RF and microwave frequencies will not provide optical shielding (i.e., shielding of optical frequencies). Furthermore, the $\lambda/10$ pitch of vias in a via fence often used to provide shielding at RF and microwave frequencies cannot be simply extrapolated to optical frequencies, since such a small pitch may be challenging to fabricate. For example, a microwave frequency of 1 GHz would suggest a via pitch of approximately $\lambda/10=3$ cm, while an optical frequency of 300 THz would suggest a via pitch of approximately $\lambda/10=100$ nm. Instead, a feasible, manufacturable pitch between adjacent vias may be on the order of several wavelengths (e.g., 1000-4000 nm). Due to such constraints, the optical shielding may be designed from the perspective of ray tracing of light, amongst other perspectives. In some examples, the possible directions in which light from any of a variety of sources or scattering locations may propagate is described in terms of light rays (or simply "rays"). The "order" of a light ray may be referenced to indicate a number of times that light originating from an original ray of light has been reflected.

Figure 1B:
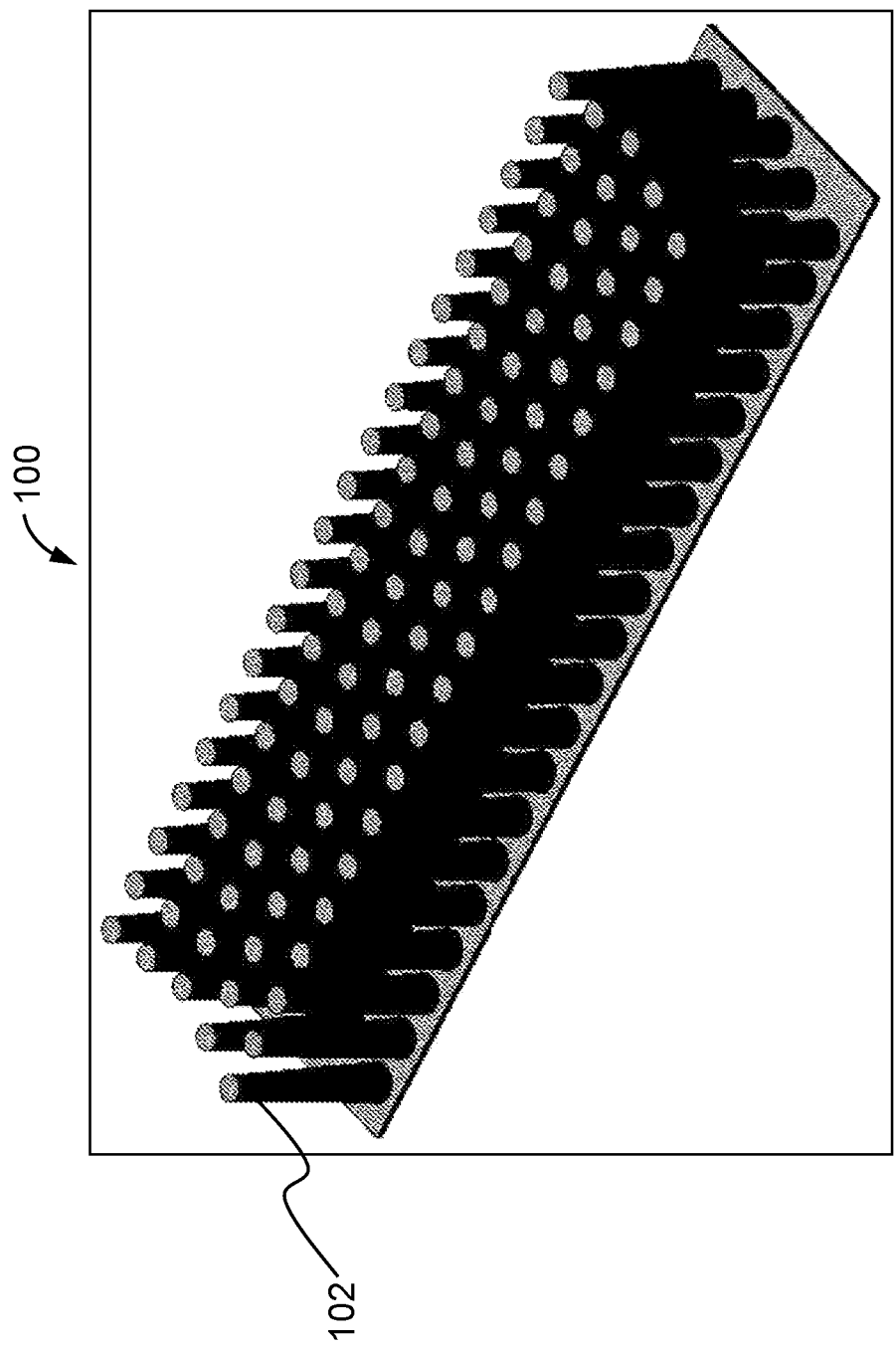

FIGS. 1A and 1B show an example staggered chevron pattern 100 of OSVs 102 with controlled offsets (i.e., with selected negative increments and positive increments of OSVs 102) about a vertical dashed line 103. The staggered chevron pattern 100 is an example of a packing pattern for OSVs, also referred to as an array of OSVs.

FIG. 1A shows the staggered chevron pattern 100, as viewed from above. The staggered chevron pattern 100 provides optical shielding by preventing zeroth-order rays (i.e., an unimpeded ray of light propagating in a single straight line) originating from beneath the staggered chevron pattern 100 from traversing through the staggered chevron pattern 100 without any reflections off of one or more OSVs 102, regardless of the incoming in-plane angle, p. However, a first-order reflected ray 104 that reflects off of a single OSV 106 can traverse through the staggered chevron pattern 100. By changing the controlled offsets of the staggered chevron pattern 100 to provide different controlled offsets for different rows, a staggered chevron pattern may be designed so as to prevent arbitrary $n^{th}$-order reflections, and therefore provide optical shielding to the region above the staggered chevron pattern 100 from undesired light in the region below the staggered chevron pattern 100. The addition of more horizontal rows can further assist to prevent higher-order rays (e.g., second-order reflected rays that reflect off of two OSVs) from traversing through the array of OSVs.

FIG. 1B shows a perspective view of the staggered chevron pattern 100, as viewed from above at an angle. OSVs 102 are arranged to prevent zeroth-order rays (i.e., a single straight line) from traversing through the staggered chevron pattern 100 without any reflections off of one or more OSVs 102. The OSVs 102 are tapered such that bottom of the OSVs 102 has a larger circular cross-sectional area than the top of the OSVs 102. As disclosed herein, such a taper may enhance out-of-plane reflections of light off of the OSVs, thereby enhancing the optical shielding. In general, designing patterns of OSVs can be challenging if the pitch of the OSVs exceeds approximately four times the size of the OSVs themselves.

Figure 1C:
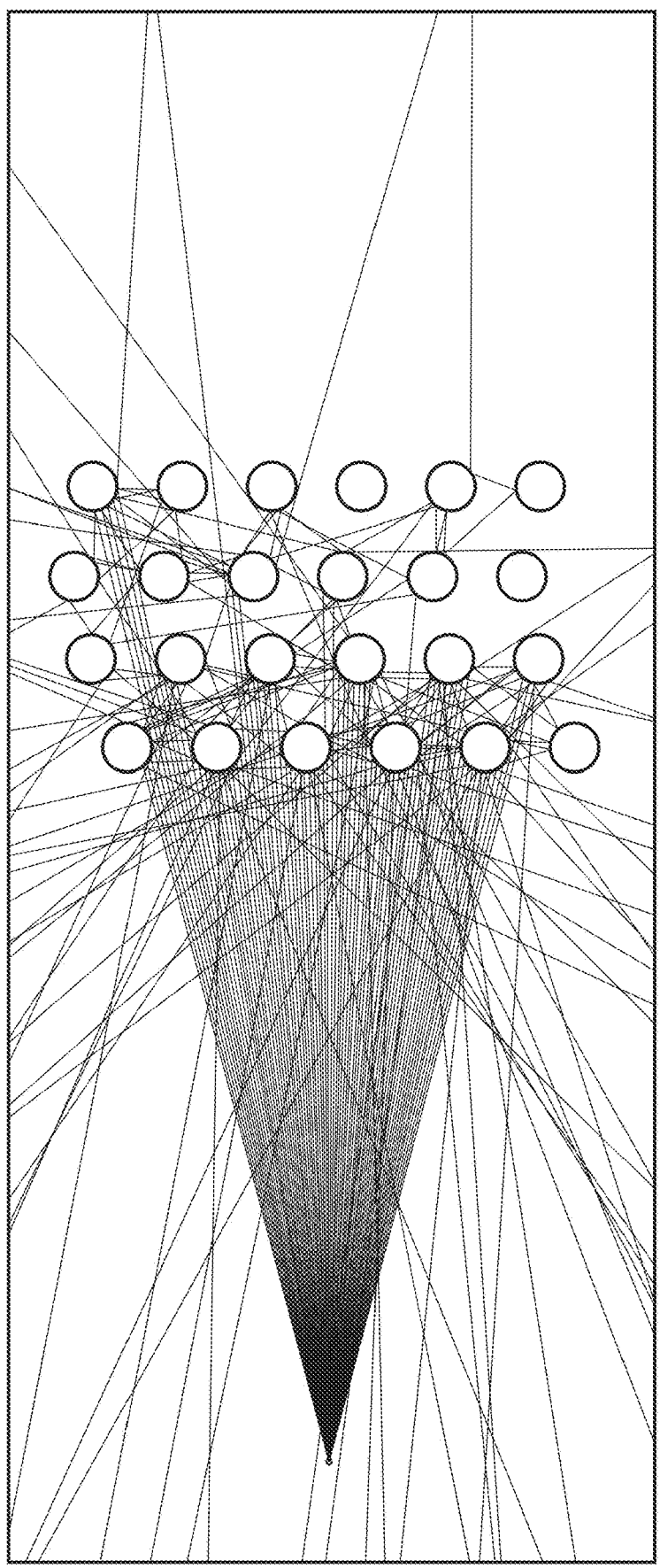
FIG. 1C shows a schematic diagram of an example staggered pattern of OSVs with a plurality of light rays.

FIG. 1C shows an example staggered pattern of OSVs with a plurality of light rays, as viewed from above. The light rays originate on the left side as a cone of light covering many different angles of propagation. The staggered pattern of OSVs optically shield the right side from the plurality of light rays by reflecting them away from the right side.

Regarding the width and area of the OSVs, in general, vias may possess minimum and maximum manufacturable sizes. There may also be via density constraints over a local or global area so as to maintain the structural integrity of the IC, for example. In some examples, the size of the OSVs may be chosen in conjunction with a packing pattern (e.g., as described in FIGS. 1A and 1i). The width of the OSVs may be chosen to utilize available space between the source of undesirable light (also referred to as an emission source) and an optically shielded region that may contain one or more light-sensitive components.

Regarding the cross-sectional shape of the OSVs, although vias are often round due to the lower stress profile of such a shape, it is possible to implement non-round vias. In general, the shape of the OSVs may be engineered to, for example, increase or decrease the reflectivity of undesirable light in particular directions. In some examples, the cross-sectional shapes of two OSVs may be geometrically similar to one another (i.e., each cross-sectional shape can be obtained from the other cross-sectional shape by uniformly scaling (i.e., enlarging or reducing), possibly with additional translation, rotation and reflection) or geometrically congruent to one another (i.e., the cross-sectional shapes have the same shape and size, or have the same shape and size as the mirror image of the other cross-sectional shape).

FIGS. 2A, 2B, and 2C show example cross-sectional shapes of OSVs. The law of reflection provides that the angle of incidence of a light ray is equal to the angle of reflection of the light ray. Thus, the cross-sectional shape of an OSV can modify the direction (i.e., angle) of reflection of light that impinges on the OSV. In general, all sides of the OSVs can play an important role for zeroth-order light rays and/or for light that is scattered from other OSVs. The light rays are depicted in these examples as having a non-zero transverse extent, rather than as straight lines, using sinusoidal curves. But, these depictions are not to scale, and the direction of propagation of these rays is assumed to be a line through the center of these curves. Generally, the transverse profile of light is determined based on properties of the original source of the light and the materials through which the light propagates and surfaces from which the light scatters and reflects.

FIG. 2A shows an incoming light ray 202A reflecting off of an OSV 204A having a first cross-sectional shape, resulting in a reflected light ray 206A.

FIG. 2B shows an incoming light ray 202B reflecting off of an OSV 204B having a second cross-sectional shape, resulting in a reflected light ray 206B.

FIG. 2C shows an incoming light ray 202C reflecting off of an OSV 204C having a third cross-sectional shape, resulting in a reflected light ray 206C.

Regarding the vertical slope of OSVs, in general, an etched via cavity may be made at an angle so as redirect reflected undesirable light out of a plane that contains a region to be optically shielded. The redirection provided by such angled OSVs may allow for undesirable light to exit through the top or bottom of the chip, for example, thereby assisting with optical shielding. Utilizing angled vias may also reduce the requirements against $n^{th}$-order reflections from a pattern (also referred to as an array) of OSVs by ensuring that reflections are redirected significantly out of the plane after a number of reflections that is fewer than would be possible without the use of angled OSVs (i.e., compared to if the undesirable light were to remain in the plane of the optically shielded region).

In some examples, an array of OSVs comprise angled TSVs, wherein the TSV is vertically sloped (i.e., angled) through the chip (e.g., an entire substrate and a top cladding composed of $SiO_2$). Since the thickness of the chip may be on the order of 100-200 μm, the angle of the TSV's vertical slope may be smaller than desired and may result in a small reflection angle that does not significantly divert undesirable light after a single or multiple reflections.

Figure 3:
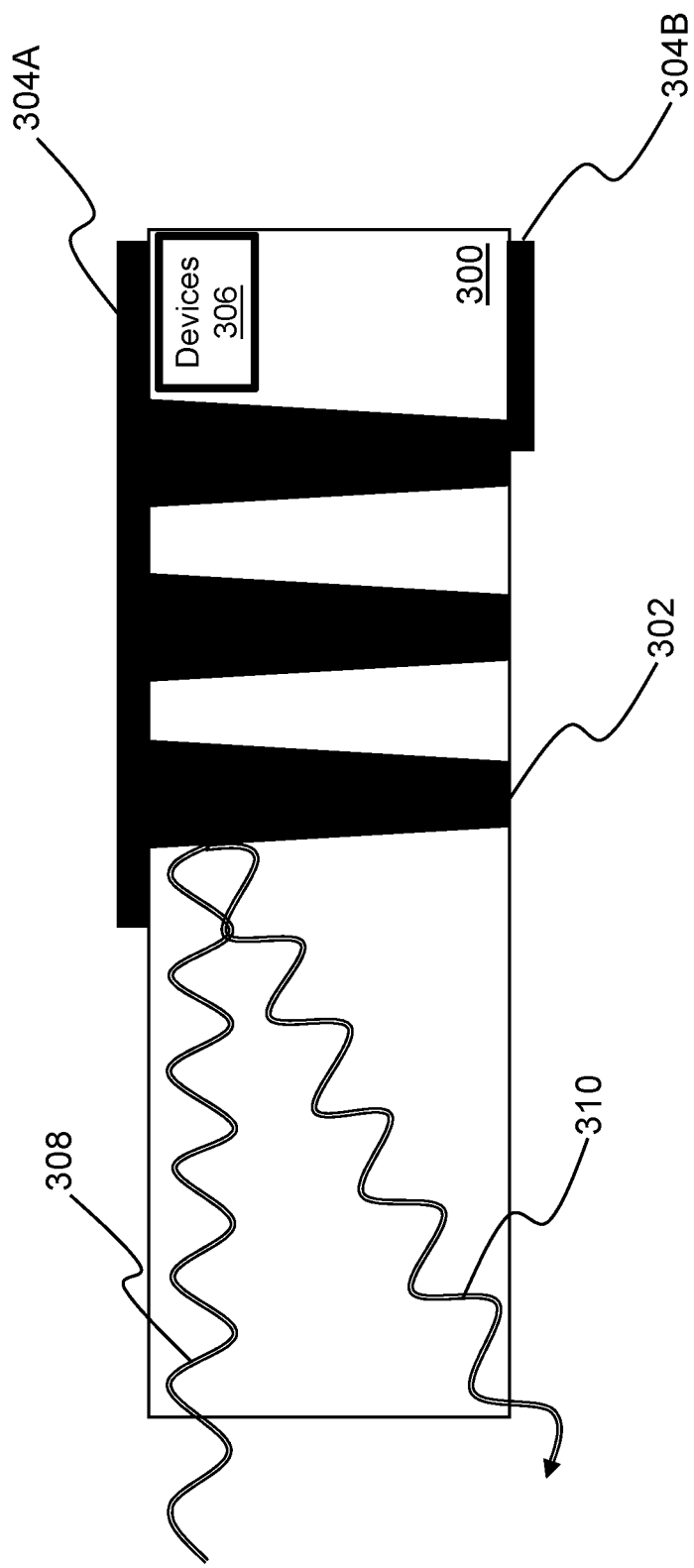
FIG. 3 is a schematic diagram of an example portion of an integrated circuit.

FIG. 3 shows an example portion of an integrated circuit 300, comprising TSV OSVs 302 electrically connected to a top redistribution layer 304A and a bottom redistribution layer 304B located at the top and bottom of the integrated circuit 300, respectively. The TSV OSVs 302, in conjunction with the top redistribution layer 304A and the bottom redistribution layer 304B, provide optical shielding to one or more devices 306. The TSV OSVs 302 can be arranged in a staggered pattern (e.g., the staggered chevron pattern 100 shown in FIGS. 1A and 1B) so as to prevent zeroth-order and/or higher-order light rays from reaching the devices 306. The devices 306 may be configured to measure a fraction of light from a waveguide (not shown), for example, by receiving light from a tap coupler waveguide (not shown) that is evanescently coupled to the waveguide. The light present in the tap coupler waveguide may be much smaller than the light in the waveguide and can provide information about the intensity of the light from the waveguide. Furthermore, the TSV OSVs 302 have a vertical slope such that incoming light 308 can be reflected as reflected light 310 that is directed through the top or bottom of the integrated circuit 300.

In general, OSVs can be electrically connected to either the top or bottom of the chip, or to both. In some examples, a first set of OSVs in a pattern can electrically connected the top of the chip, and a second set of OSVs in the pattern can be electrically connected to the bottom of the chip. OSVs do not have to be TSVs and may instead have one end that terminates within the wafer itself.

In some examples (e.g., silicon-on-insulator wafers), the optical devices and waveguides are embedded within a matrix of material characterized by a lower index of refraction (e.g., silicon dioxide or silicon nitride) located on top of a wafer substrate characterized by a higher index of refraction (e.g., silicon, indium phosphide (InP), lithium niobate, or doped silicon dioxide). In such examples, it may be beneficial to increase the angle of the vertical slope predominantly (or only) in the section of the OSVs that is within the lower index of refraction layer. The increased angle may be achieved, for example, by etching the lower index of refraction layer more aggressively prior to deposition of the OSVs. The etching may be performed by using one or more of a variety of techniques, such as those employed in the manufacturing of whispering gallery mode resonators in silica ($SiO_2$).

Figure 4:
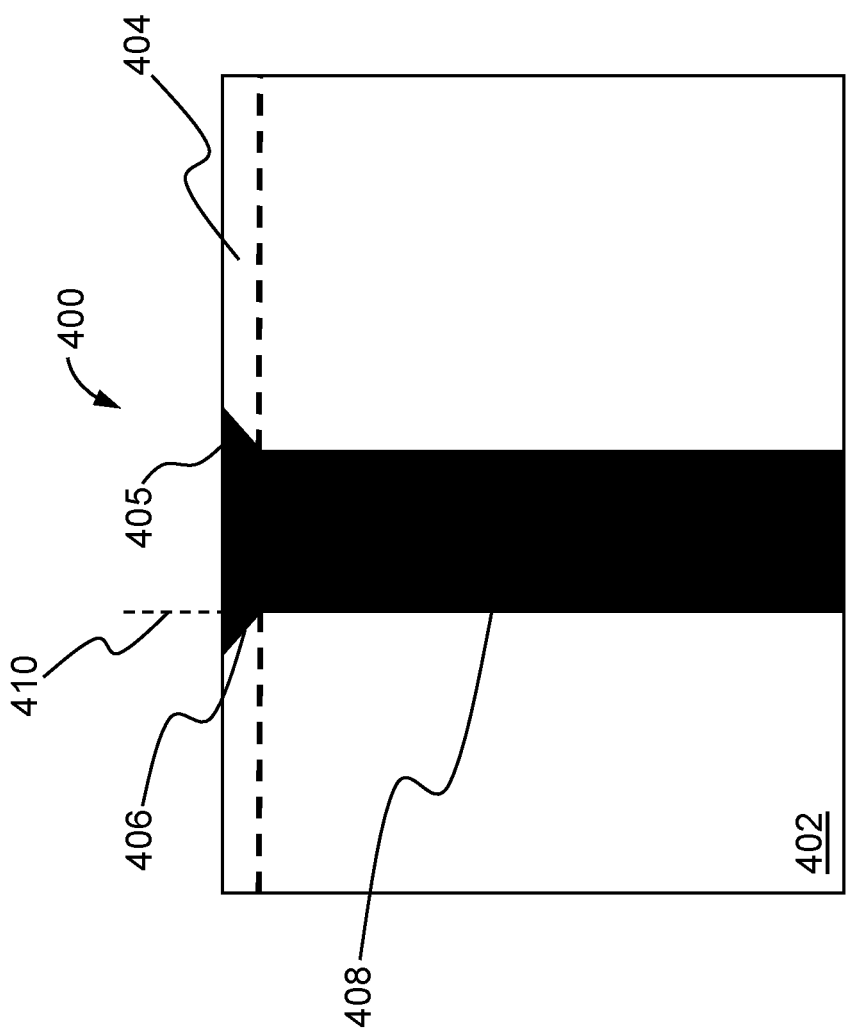
FIG. 4 is a schematic diagram of an example portion of an integrated circuit comprising a Si substrate and a $SiO_2$ layer.

FIG. 4 shows an example portion of an integrated circuit 400 comprising a Si substrate 402 (e.g., a higher index of refraction layer) and a $SiO_2$ layer 404 (e.g., a lower index of refraction layer). (Thus, the index of refraction of the Si substrate 402 is greater than the index of refraction of the $SiO_2$ layer 404.) A partially tapered OSV 405 comprises a tapered edge 406 and a vertical edge 408. The tapered edge 406 has a non-zero and possibly steep angle, with respect to a vertical axis 410, within the $SiO_2$ layer 404. The vertical edge 408 is parallel, with respect to the vertical axis 410 (i.e., forms a 0° angle), within the Si substrate 402. The partially tapered OSV 405 may provide increased optical shielding when the undesirable light originates at least in part from the $SiO_2$ layer 404. In some examples, the tapered edge 406 can be fabricated by utilizing plasma etching.

Furthermore, additional metallization layers (e.g., the top redistribution layer 304A and the bottom redistribution layer 304B shown in FIG. 3) or mechanical lids may be added to optically shield regions from undesirable light that may otherwise re-enter from the top or bottom of a chip. Similarly, absorbing materials may be placed at the top or bottom of the chip, or anti-reflective coatings may be used to facilitate light exiting from the chip, especially when used in conjunction with angled OSVs.

Figure 5:
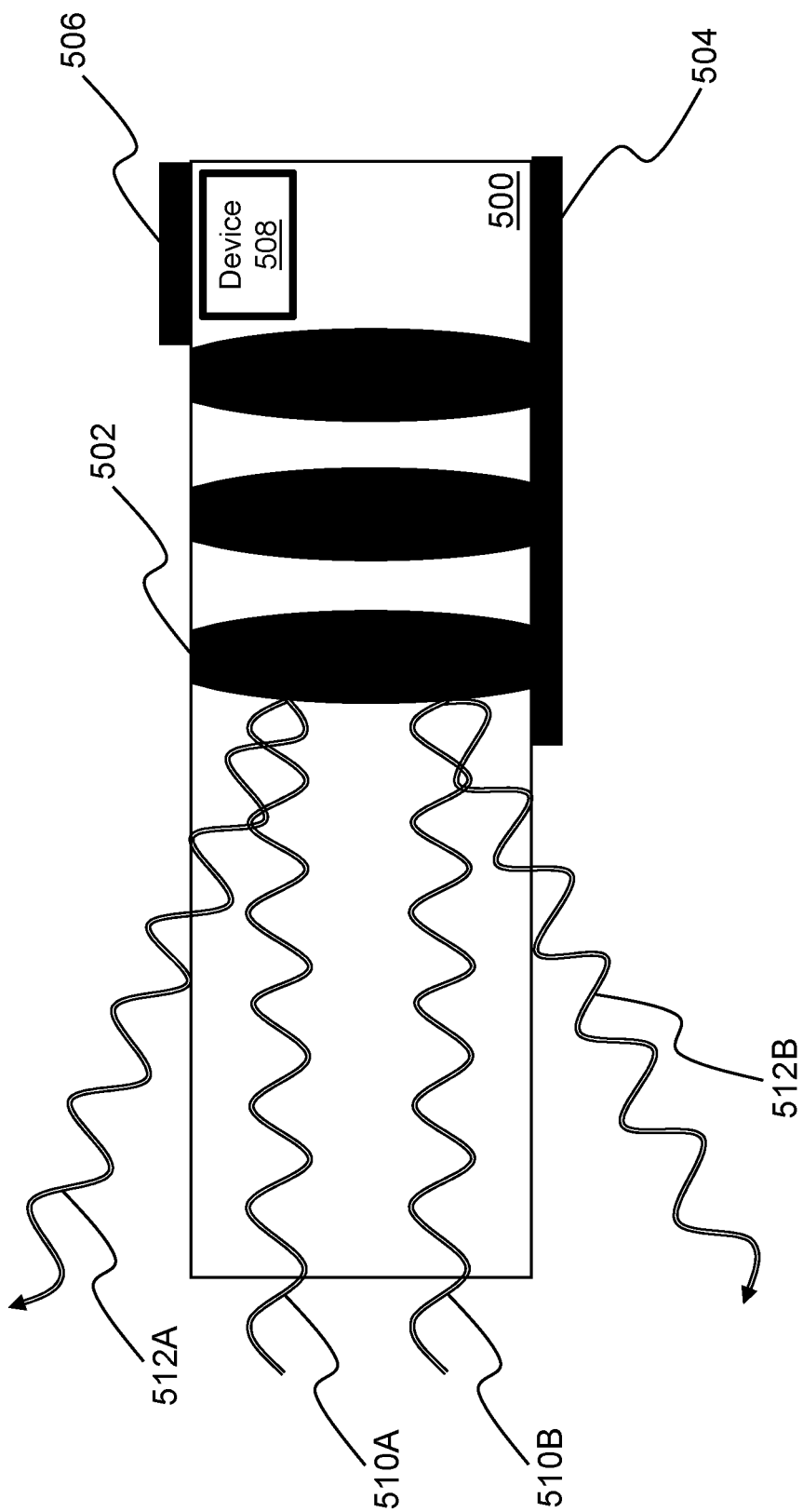
FIG. 5 is a schematic diagram of an example portion of an integrated circuit comprising curved optically shielding vias.

FIG. 5 shows an example portion of an integrated circuit 500 comprising curved OSVs 502 electrically connected to a bottom redistribution layer 504. A top redistribution layer 506 is not electrically connected to the OSVs 502 and, together with the OSVs 502 and the bottom redistribution layer 504, provides optical shielding to one or more devices 508. Due to the curved nature of the curved OSVs 502, light propagating along the horizontal axis of the integrated circuit 500 may be reflected out of the top or bottom of the integrated circuit 500. For example, the curved OSVs 502 can reflect a first incoming light ray 510A out of the top of the integrated circuit 500 as a first reflected light ray 512A and can reflect a second incoming light ray 510B out of the bottom of the integrated circuit 500 as a second reflected light ray 512B.

Figure 6:
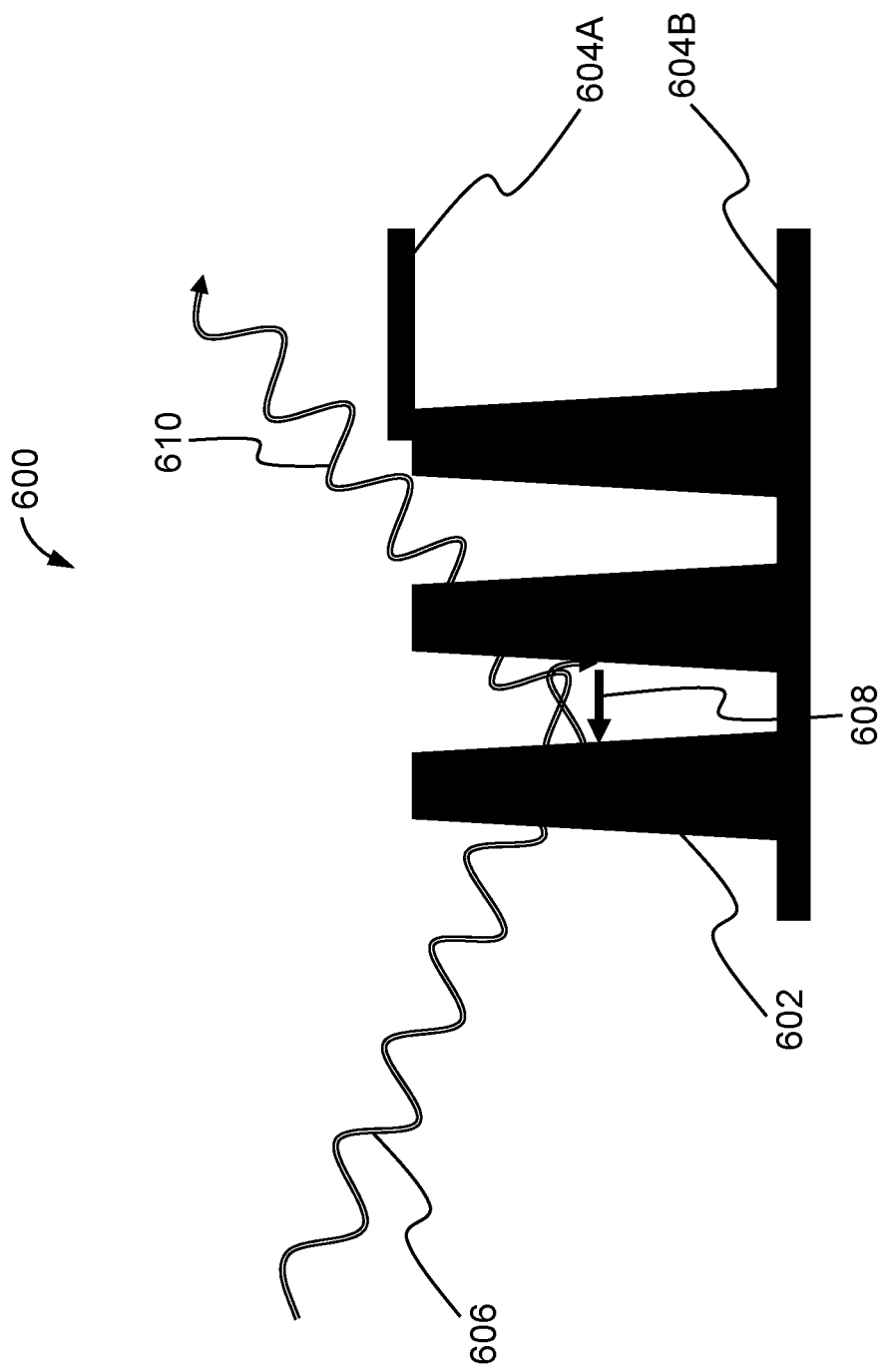
FIG. 6 is a schematic diagram of an example portion of an integrated circuit comprising tapered optically shielding vias.

FIG. 6 shows an example portion of an integrated circuit 600 comprising tapered OSVs 602 electrically connected to a top redistribution layer 604A and a bottom redistribution layer 604B. Incoming light 606 reflects off one of the tapered OSVs 602, propagates backwards along a path demarcated by an arrow 608, reflect off another of the tapered OSVs 602, and is deflected vertically away from the integrated circuit 600 as reflected light 610. Although such a configuration of tapered OSVs 602 may result in some incoming angles of light being redirected into the plane that is attempting to be optically shielded, the redirected light can then reflect from a sufficient number of tapered OSVs 602 so as to ensure that the reflected light 610 increases its angle away from the optically shielded plane.

One typical source of light contamination results from a fiber-to-chip coupling interface. For example, light that fails to couple into a waveguide on a chip can result in a cone of undesirable light propagating outside of the waveguide.

FIG. 7 shows an example portion of an integrated circuit 700 receiving input light 702 (e.g., from an external optical fiber) into a waveguide 704. Light not coupled into the waveguide 704 forms a cone of undesirable light 706 that acts a source of undesirable light. In general, undesirable light may propagate in a range of emission angles. An array of OSVs 708 is arranged so as to optically shield one or more devices 710 from the cone of undesirable light 706. In general, the array of OSVs 708 may depend on the expected source of undesirable light, such as its emission pattern, location, and wavelength, as well as the location of the devices to be optically shielded from the undesirable light.

In some examples, an integrated circuit comprises a volume comprising one or more materials between a first plane, a second plane, and, positioned between the first plane and the second plane, at least a portion of one or more of an optical waveguide, optical gain medium, photodetector, or electro-optic device. (As described above, the volume can be included in an article of manufacture, and can be formed as part of a method.) The integrated circuit further comprises a plurality of light-impeding structures (e.g., OSVs) configured to absorb light, reflect light, or both absorb and reflect light. The plurality of light-impeding structures comprise a first set of light-impeding structures arranged such that each light-impeding structure in the first set (1) intersects the first plane of the volume with a first cross-sectional shape, (2) intersects the second plane of the volume with a second cross-sectional shape, (3) comprises a first maximum cross-sectional length equal to the length of the longest line between two maximally separated points of the first cross-sectional shape, (4) comprises a second maximum cross-sectional length equal to the length of the longest line between two maximally separated points of the second cross-sectional shape, and (5) is separated from one or more nearest neighboring light-impeding structures in the first set by a distance no larger than four times the length of the first maximum cross-sectional length or four times the length of the second maximum cross-sectional length. The integrated circuit is configured to impede light propagation through one or more points, such that any line that (1) intersects the one or more points, (2) is entirely within the volume, and (3) traverses through the first set of light-impeding structures, intersects at least one light-impeding structure. In some examples, the first cross-sectional shape and the second cross-sectional shape are geometrically similar or are geometrically congruent.

In some examples, the OSV material may be optimized for reflectivity, absorption, or a combination thereof. Fully metallic vias are expected to be nearly fully reflective, whereas doped Si vias are expected to provide additional absorption, depending on the exact form factor. In some examples, the choice of OSV material may also be done in conjunction with the intended purpose of the OSVs as electrical conductors (e.g., if the OSVs are also to be used for transmitting electrical signals).

Figure 8B:
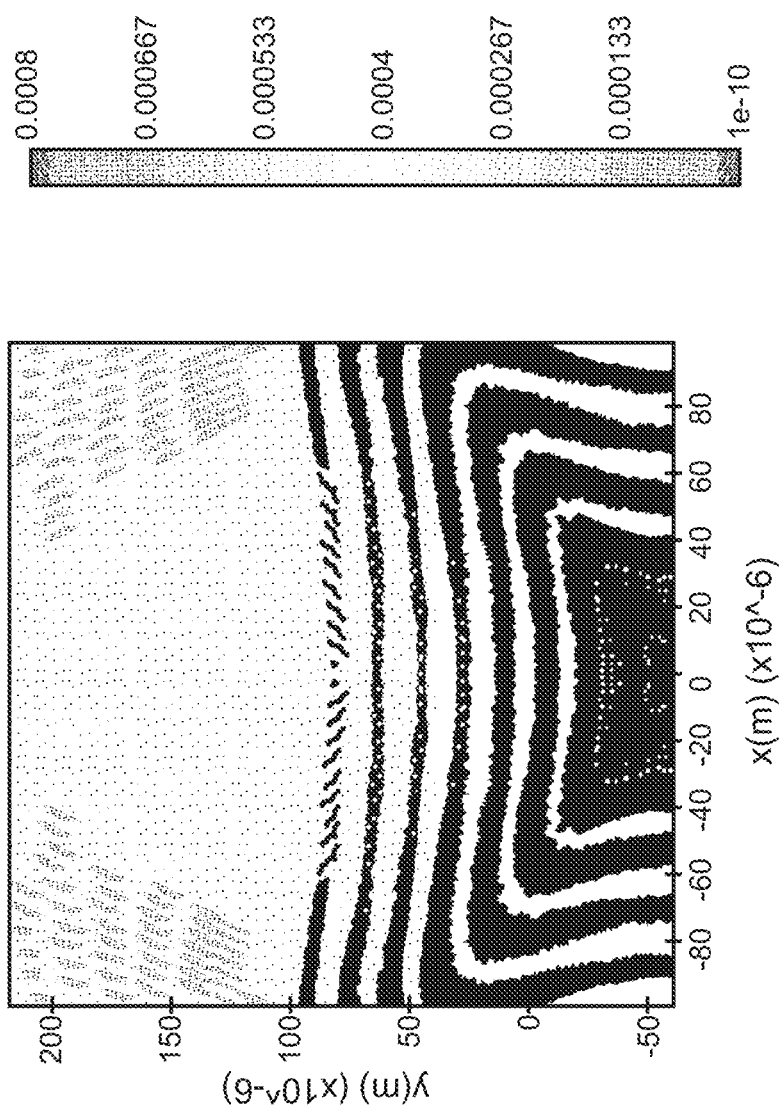
FIG. 8B is a prophetic plot of the electric field magnitude generated in a cross-section within a $SiO_2$ layer and perpendicular to the vertical oscillation direction of an electric dipole represented by a point source.
Figure 8A:
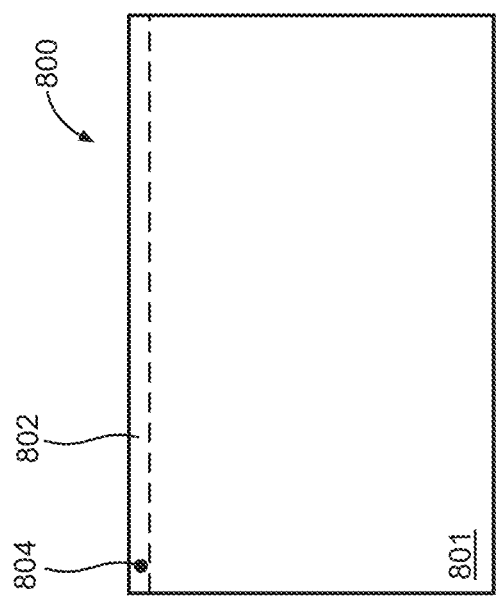
FIG. 8A is a schematic diagram of an example portion of an integrated circuit.

FIG. 8A shows an example portion of an integrated circuit 800 comprising a Si substrate 801 and a $SiO_2$ layer 802. A point source 804 is simulated as an electric dipole oscillating in the vertical direction and emitting optical waves at a wavelength of $\lambda=1.6$ μm. In this example, the integrated circuit 800 does not comprise OSVs.

FIG. 8B shows a prophetic plot of the electric field magnitude generated in a cross-section within the $SiO_2$ layer 802 in FIG. 8A and perpendicular to the vertical oscillation direction of the electric dipole represented by the point source 804 in FIG. 8A. The amount of light from the point source 804 in FIG. 8A is not significantly diminished as the light travels within the cross-section.

Figure 9B:
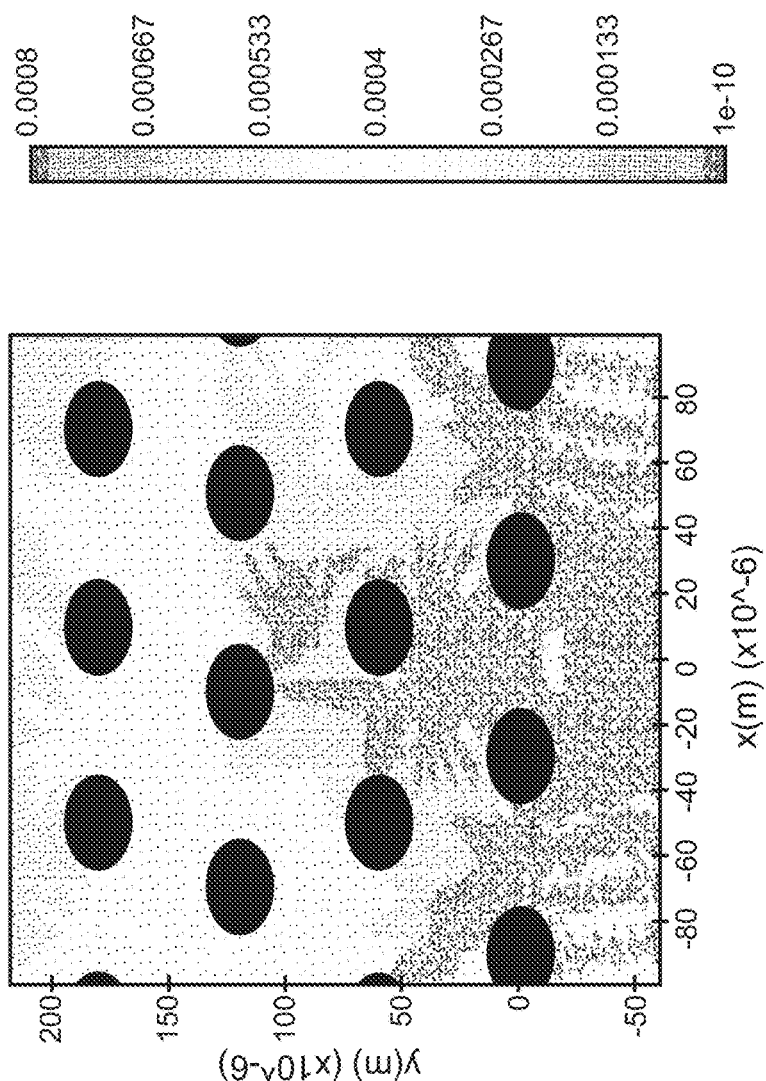
FIG. 9B is a prophetic plot of the electric field magnitude generated in a cross-section within a $SiO_2$ layer and perpendicular to the vertical oscillation direction of an electric dipole represented by a point source.
Figure 9A:
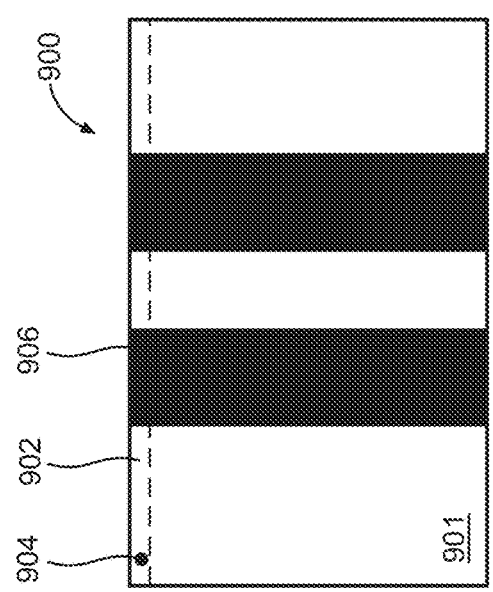
FIG. 9A is a schematic diagram of an example portion of an integrated circuit.

FIG. 9A shows an example portion of an integrated circuit 900 comprising a Si substrate 901 and a $SiO_2$ layer 902. A point source 904 is simulated as an electric dipole oscillating in the vertical direction and emitting optical waves at a wavelength of $\lambda=1.6$ μm. In this example, the integrated circuit 900 further comprises vertically edged OSVs 906.

FIG. 9B shows a prophetic plot of the electric field magnitude generated in a cross-section within the $SiO_2$ layer 902 in FIG. 9A and perpendicular to the vertical oscillation direction of the electric dipole represented by the point source 904 in FIG. 9A. The amount of light from the point source 904 in FIG. 9A is diminished as the light travels through the vertically edges OSVs 906.

FIG. 10A shows an example portion of an integrated circuit 1000 comprising a Si substrate 1001 and a $SiO_2$ layer 1002. A point source 1004 is simulated as an electric dipole oscillating in the vertical direction and emitting optical waves at a wavelength of $\lambda=1.6$ μm. In this example, the integrated circuit 1000 further comprises partially tapered OSVs 1006 (e.g., such as the partially tapered OSV 405 shown in FIG. 4). The partially tapered OSV 1006 comprises two distinct portions within the integrated circuit 1000: a tapered edge 1008 and a vertical edge 1010. The tapered edge 1008 has a possibly steep angle, with respect to a vertical axis 1012, within the SiO$_2$ layer 1002. The vertical edge 1010 is parallel, with respect to the vertical axis 1012 (i.e., forms a 0° angle), within the Si substrate 1001. The partially tapered OSV 1006 may provide increased optical shielding when the undesirable incoming optical cross-talk originates mostly from the SiO$_2$ layer 1002.

FIG. 10B shows a prophetic plot of the electric field magnitude generated in a cross-section within the SiO$_2$ layer 1002 in FIG. 10A and perpendicular to the vertical oscillation direction of the electric dipole represented by the point source 1004 in FIG. 10A. The amount of light from the point source 1004 in FIG. 10A is further diminished, compared to the case of the vertically edges OSVs 906 in FIG. 9A, as the light travels through the vertically edges OSVs 906.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An article of manufacture comprising:
   a volume comprising one or more materials between a first plane and a second plane;
   positioned between the first plane and the second plane, at least a portion of one or more of an optical waveguide, an optical gain medium, a photodetector, or an electro-optic device; and
   a plurality of light-impeding structures configured to absorb light, reflect light, or both absorb and reflect light, the plurality of light-impeding structures comprising a first set of light-impeding structures arranged such that each light-impeding structure in the first set
      intersects the first plane with a first cross-sectional shape,
      intersects the second plane with a second cross-sectional shape,
      comprises a first maximum cross-sectional length equal to the length of a longest line between two maximally separated points of the first cross-sectional shape,
      comprises a second maximum cross-sectional length equal to the length of the longest line between two maximally separated points of the second cross-sectional shape, and
      is separated from one or more nearest neighboring light-impeding structures in the first set by a distance no larger than four times the length of the first maximum cross-sectional length or four times the length of the second maximum cross-sectional length;
   wherein light propagation through one or more points is impeded, such that any line that intersects at least one of the one or more points, is entirely within the volume, and traverses through the first set of light-impeding structures, intersects at least one light-impeding structure.

2. The article of manufacture of claim 1, wherein the first cross-sectional shape and the second cross-sectional shape are geometrically similar.

3. The article of manufacture of claim 2, wherein the first cross-sectional shape and the second cross-sectional shape are geometrically congruent.

4. The article of manufacture of claim 1, wherein the light has a wavelength between about 100 nm and 1 mm.

5. The article of manufacture of claim 1, wherein each light-impeding structure in the first set
   intersects a third plane located between the first plane and the second plane with a third cross-sectional shape, and
   comprises a third maximum cross-sectional length equal to the length of a longest line between two maximally separated points of the third cross-sectional shape
   wherein the third maximum cross-sectional length is not equal to at least one of the first maximum cross-sectional length, or the second maximum cross-sectional length.

6. The article of manufacture of claim 5, wherein the third maximum cross-sectional length is not equal to the first maximum cross-sectional length and is equal to the second maximum cross-sectional length.

7. The article of manufacture of claim 5, wherein
   the one or more materials between the first plane and the third plane comprise at least one of silicon dioxide or silicon nitride; and
   the one or more materials between the third plane and the second plane comprise silicon, indium phosphide (InP), lithium niobate, or doped silicon dioxide.

8. The article of manufacture of claim 5, wherein
   at least one of the one or more materials between the first plane and the third plane has a first index of refraction; and
   at least one of the one or more materials between the third plane and the second plane comprise has a second index of refraction greater than the first index of refraction.

9. The article of manufacture of claim 5, wherein the third maximum cross-sectional length is larger than each of the first maximum cross-sectional length and the second maximum cross-sectional length.

10. The article of manufacture of claim 1, further comprising a metallic layer adjacent to the first plane or the second plane, wherein at least a portion of the metallic layer is vertically above or below at least a portion of the one or more of the optical waveguide, the optical gain medium, the photodetector, or the electro-optic device.

11. The article of manufacture of claim 1, wherein at least one of the optical waveguide, the optical gain medium, the photodetector, or the electro-optic device is configured to be used in an interferometric measurement.

12. The article of manufacture of claim 1, wherein at least one of the optical waveguide, the optical gain medium, the photodetector, or the electro-optic device is configured to be used to perform coherent transmitting or coherent receiving of light.

13. The article of manufacture of claim 1, wherein at least one of the optical waveguide, the optical gain medium, the photodetector, or the electro-optic device is configured to measure an intensity of light coupled from a first optical waveguide to a second optical waveguide.

14. The article of manufacture of claim 1, wherein a transmitted electromagnetic energy associated with light from the one or more points that traverses entirely through the light-impeding structures is smaller than an incident electromagnetic energy associated with light from the one or more points that is incident on the light-impeding structures.

15. The article of manufacture of claim 1, further comprising an optical port providing light from a light source, wherein the first set of light-impeding structures is positioned between the optical port and at least one of the optical waveguide, the optical gain medium, the photodetector, or the electro-optic device.

16. A method comprising:
forming a volume comprising one or more materials between a first plane and a second plane;
forming, positioned between the first plane and the second plane, at least a portion of one or more of an optical waveguide, an optical gain medium, a photodetector, or an electro-optic device; and
forming a plurality of light-impeding structures configured to absorb light, reflect light, or both absorb and reflect light, the plurality of light-impeding structures comprising a first set of light-impeding structures arranged such that each light-impeding structure in the first set
intersects the first plane with a first cross-sectional shape,
intersects the second plane with a second cross-sectional shape,
comprises a first maximum cross-sectional length equal to the length of a longest line between two maximally separated points of the first cross-sectional shape,
comprises a second maximum cross-sectional length equal to the length of the longest line between two maximally separated points of the second cross-sectional shape, and
is separated from one or more nearest neighboring light-impeding structures in the first set by a distance no larger than four times the length of the first maximum cross-sectional length or four times the length of the second maximum cross-sectional length;
wherein light propagation through one or more points is impeded, such that any line that intersects at least one of the one or more points, is entirely within the volume, and traverses through the first set of light-impeding structures, intersects at least one light-impeding structure.

17. The method of claim 16, wherein the light has a wavelength between about 100 nm and 1 mm.

18. The method of claim 16, wherein each light-impeding structure in the first set
intersects a third plane located between the first plane and the second plane with a third cross-sectional shape, and
comprises a third maximum cross-sectional length equal to the length of the longest line between two maximally separated points of the third cross-sectional shape
wherein the third maximum cross-sectional length is not equal to at least one of the first maximum cross-sectional length, or the second maximum cross-sectional length.

19. The method of claim 18, wherein the third maximum cross-sectional length is not equal to the first maximum cross-sectional length and is equal to the second maximum cross-sectional length.

20. The method of claim 16, wherein at least one of the optical waveguide, the optical gain medium, the photodetector, or the electro-optic device is configured to measure an intensity of light coupled from a first optical waveguide to a second optical waveguide.

* * * * *